(12) United States Patent
Sin

(10) Patent No.: US 8,251,545 B2
(45) Date of Patent: Aug. 28, 2012

(54) LIGHTING DEVICE AND DISPLAY DEVICE INCLUDING THE SAME

(75) Inventor: Kwang Sa Sin, Gumi-si (KR)

(73) Assignee: LG Electronics Inc., Seoul (KR)

( * ) Notice: Subject to any disclaimer, the term of this patent is extended or adjusted under 35 U.S.C. 154(b) by 576 days.

(21) Appl. No.: 12/524,930

(22) PCT Filed: Oct. 1, 2008

(86) PCT No.: PCT/KR2008/005771
§ 371 (c)(1),
(2), (4) Date: Jul. 29, 2009

(87) PCT Pub. No.: WO2009/045041
PCT Pub. Date: Apr. 9, 2009

(65) Prior Publication Data
US 2010/0110722 A1 May 6, 2010

(30) Foreign Application Priority Data
Oct. 2, 2007 (KR) ........................ 10-2007-0099278

(51) Int. Cl.
*F21V 9/00* (2006.01)

(52) U.S. Cl. ......... 362/293; 362/235; 200/314; 200/345
(58) Field of Classification Search .................. 362/235, 362/293, 583; 200/314, 344, 345
See application file for complete search history.

(56) References Cited

U.S. PATENT DOCUMENTS

| 6,720,892 | B1* | 4/2004 | Lachor ........................... 200/314 |
| 6,984,797 | B2* | 1/2006 | Morita et al. .................. 200/314 |
| 2004/0256210 | A1 | 12/2004 | Morita et al. |
| 2005/0194241 | A1 | 9/2005 | Kim |
| 2005/0200560 | A1 | 9/2005 | Noguchi |

FOREIGN PATENT DOCUMENTS

| CN | 2809676 Y | 8/2006 |
| JP | 2005-347280 | 12/2005 |

OTHER PUBLICATIONS

Chinese Office Action dated Mar. 3, 2011 issued in Application No. 200880006679.8.
International Search Report dated Mar. 20, 2009.

* cited by examiner

*Primary Examiner* — Stephen F Husar
(74) *Attorney, Agent, or Firm* — KED & Associates LLP

(57) ABSTRACT

A lighting device and a display apparatus are disclosed. The lighting device includes at least one light source installed on a substrate, spaced apart a predetermined distance from each other, and a filter member provided over the at least one light source having a variable thickness. Light emitted from the at least one light source transmits through the filter member. The display apparatus includes a panel that displays an image, a front cover that supports a front edge portion of the panel, and a lighting device mounted in an open portion formed at the front cover, the lighting device being exposed outside.

21 Claims, 14 Drawing Sheets

[Fig. 1]
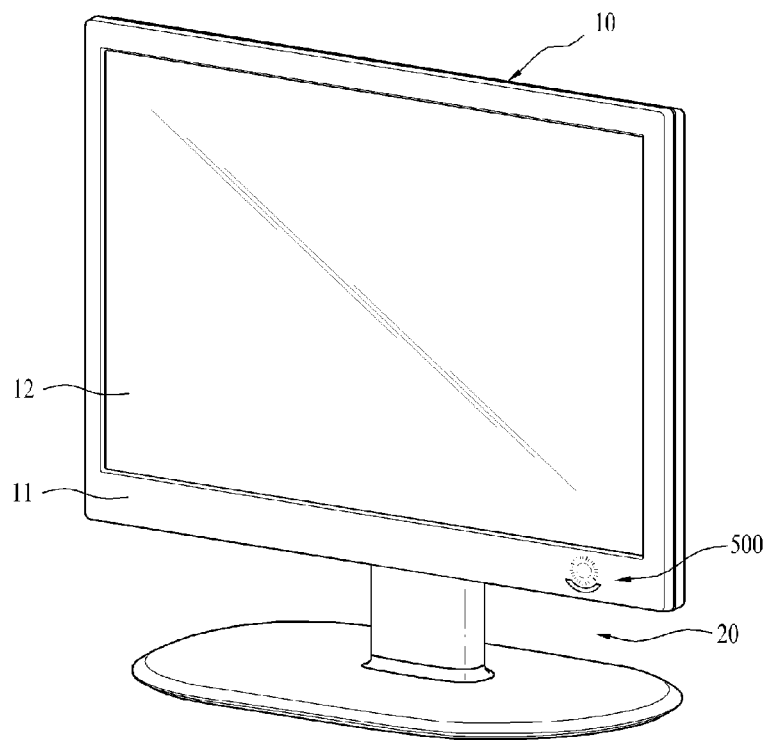
[Fig. 2]
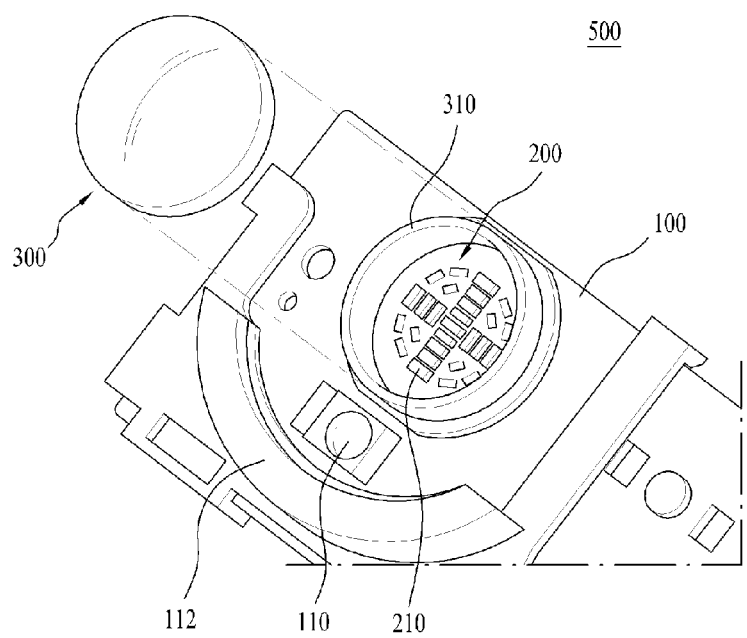

[Fig. 3]
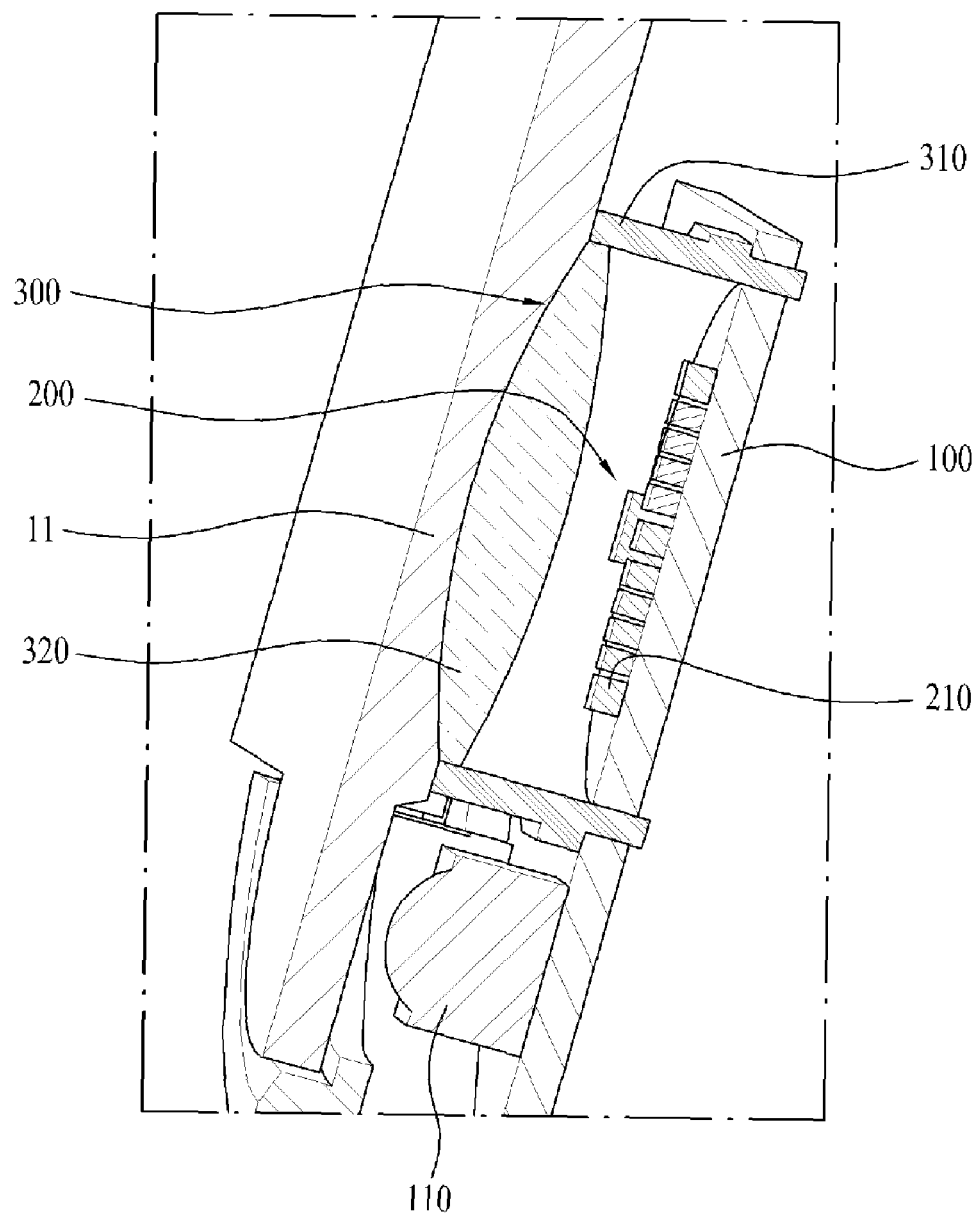

[Fig. 4]
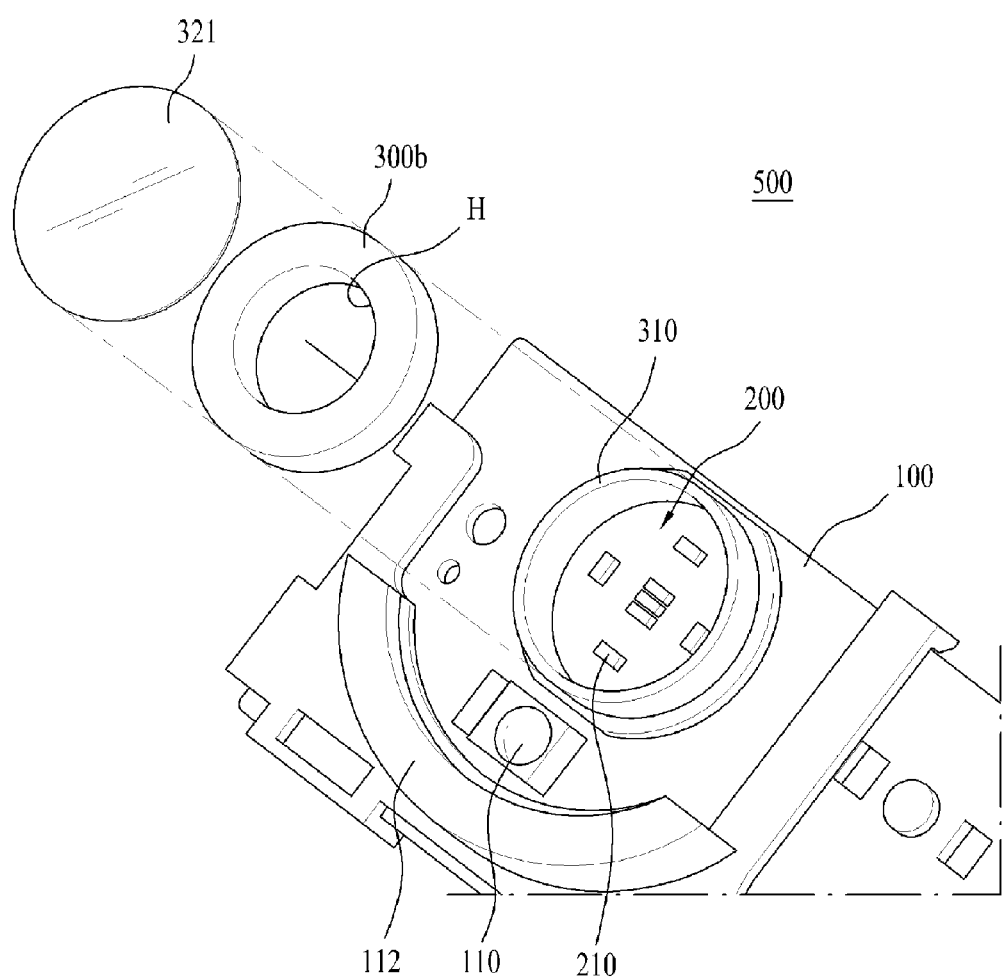

[Fig. 5]
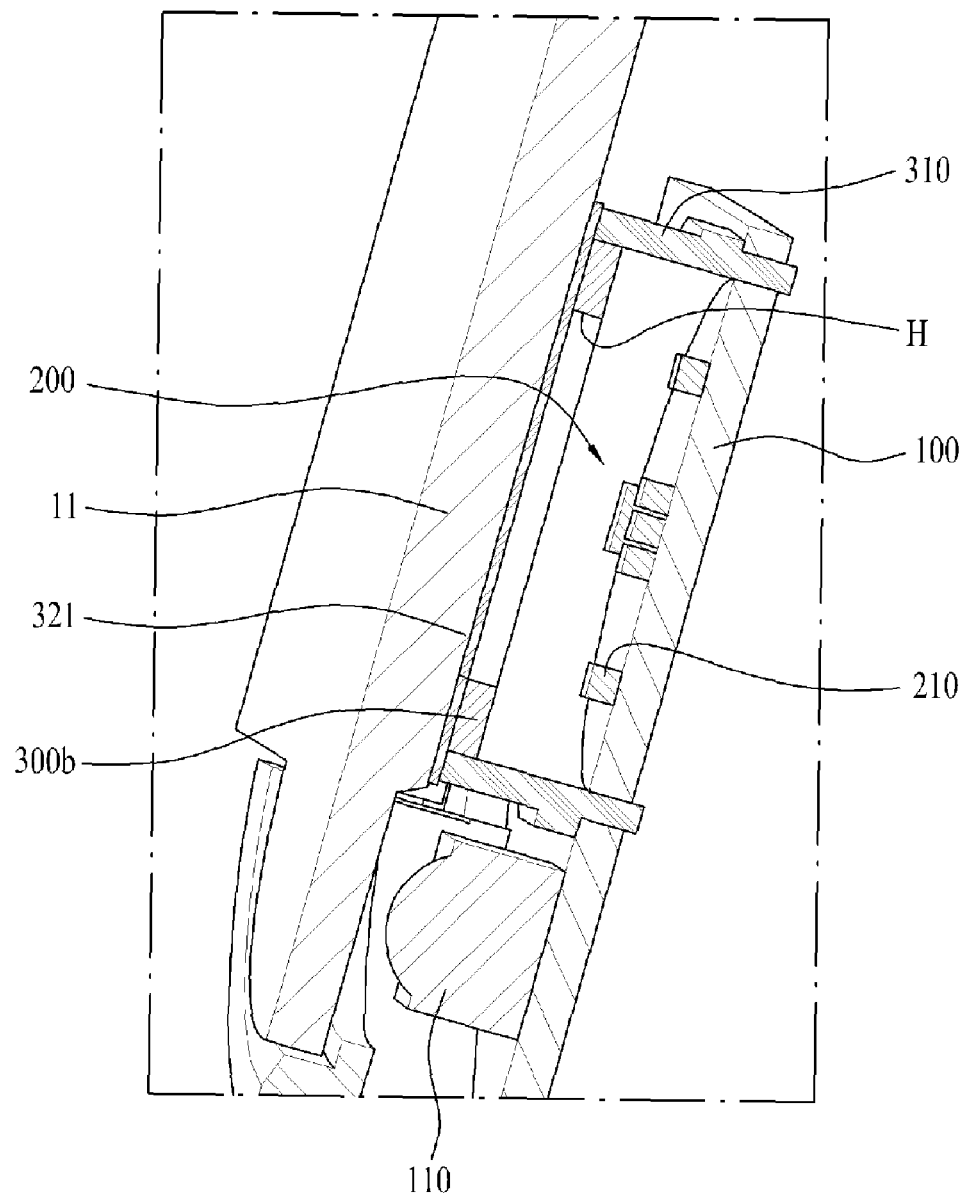

[Fig. 6]
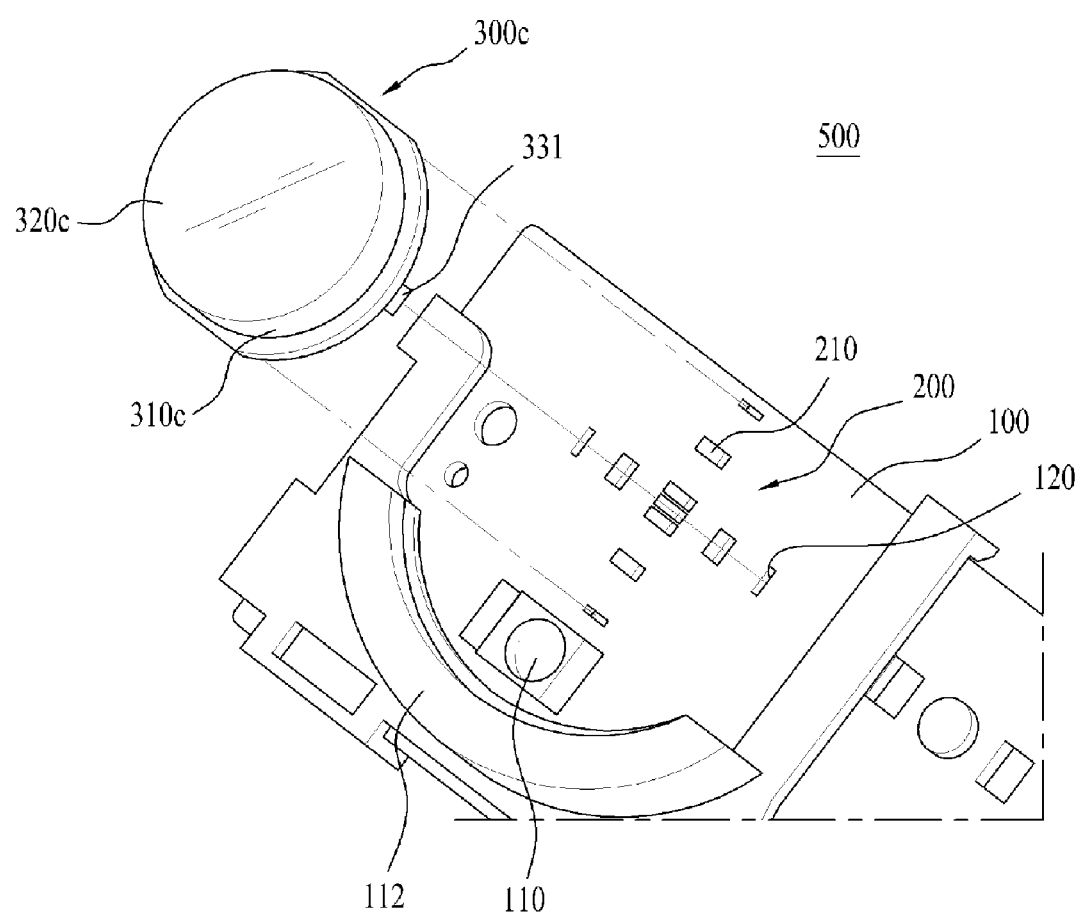

[Fig. 7]
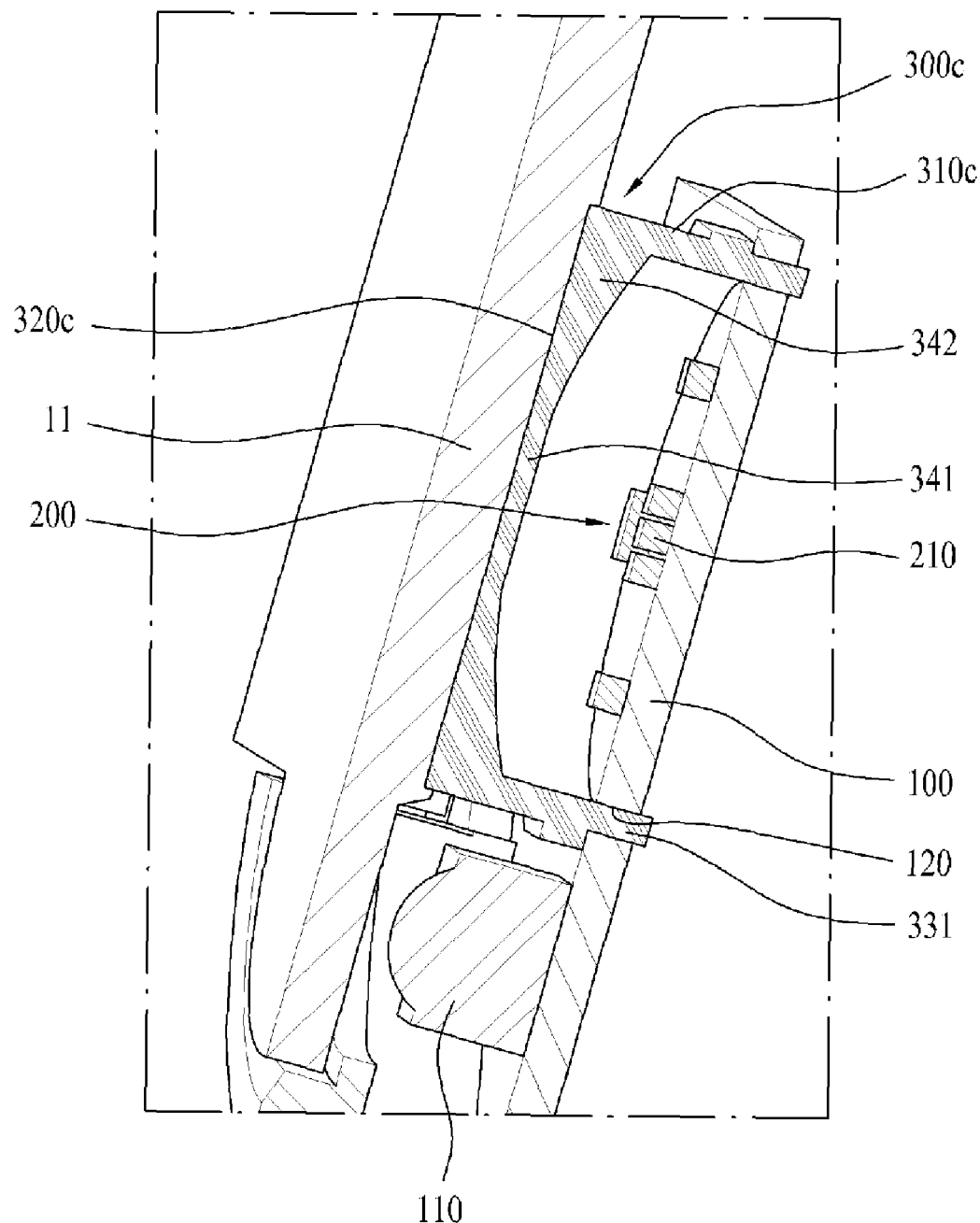

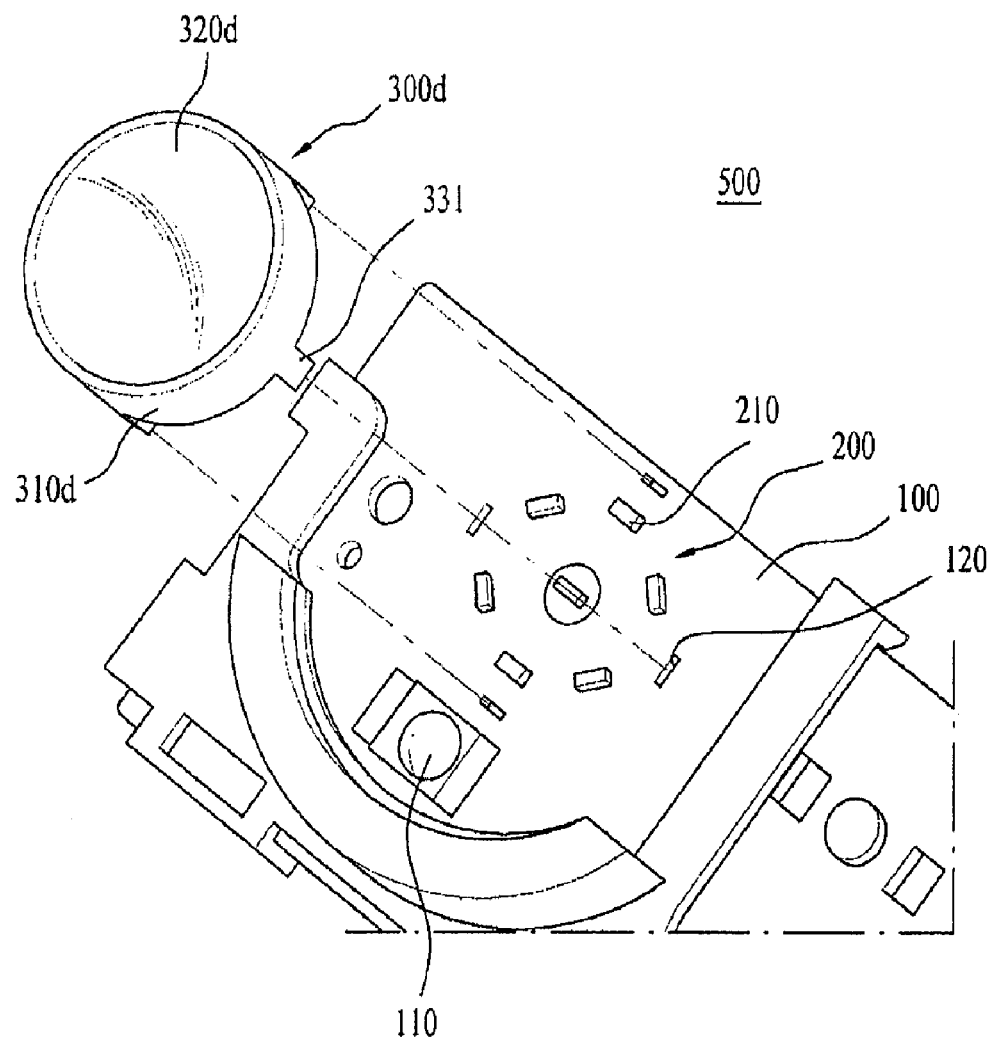
[Fig. 8]

[Fig. 9]
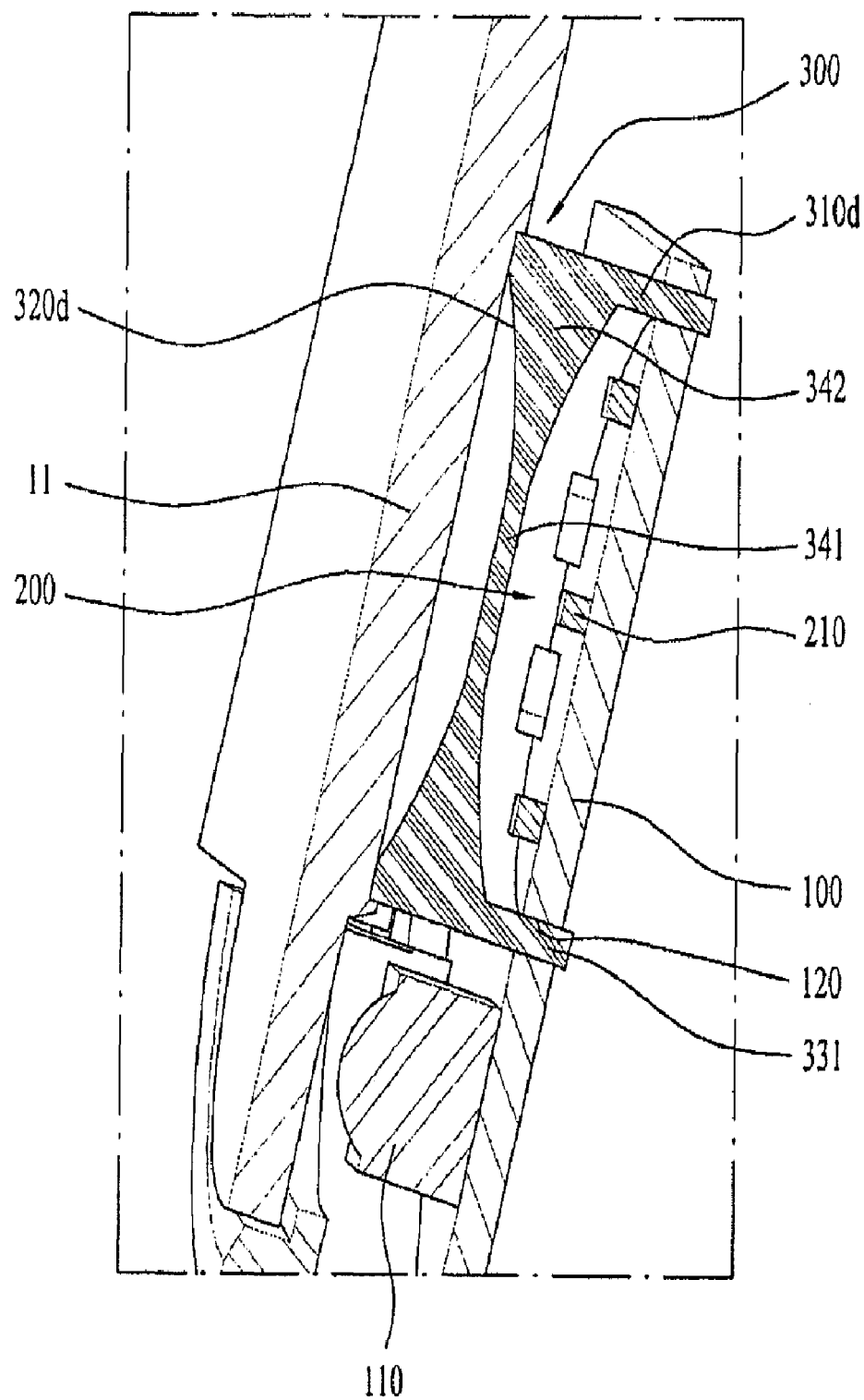

[Fig. 10]
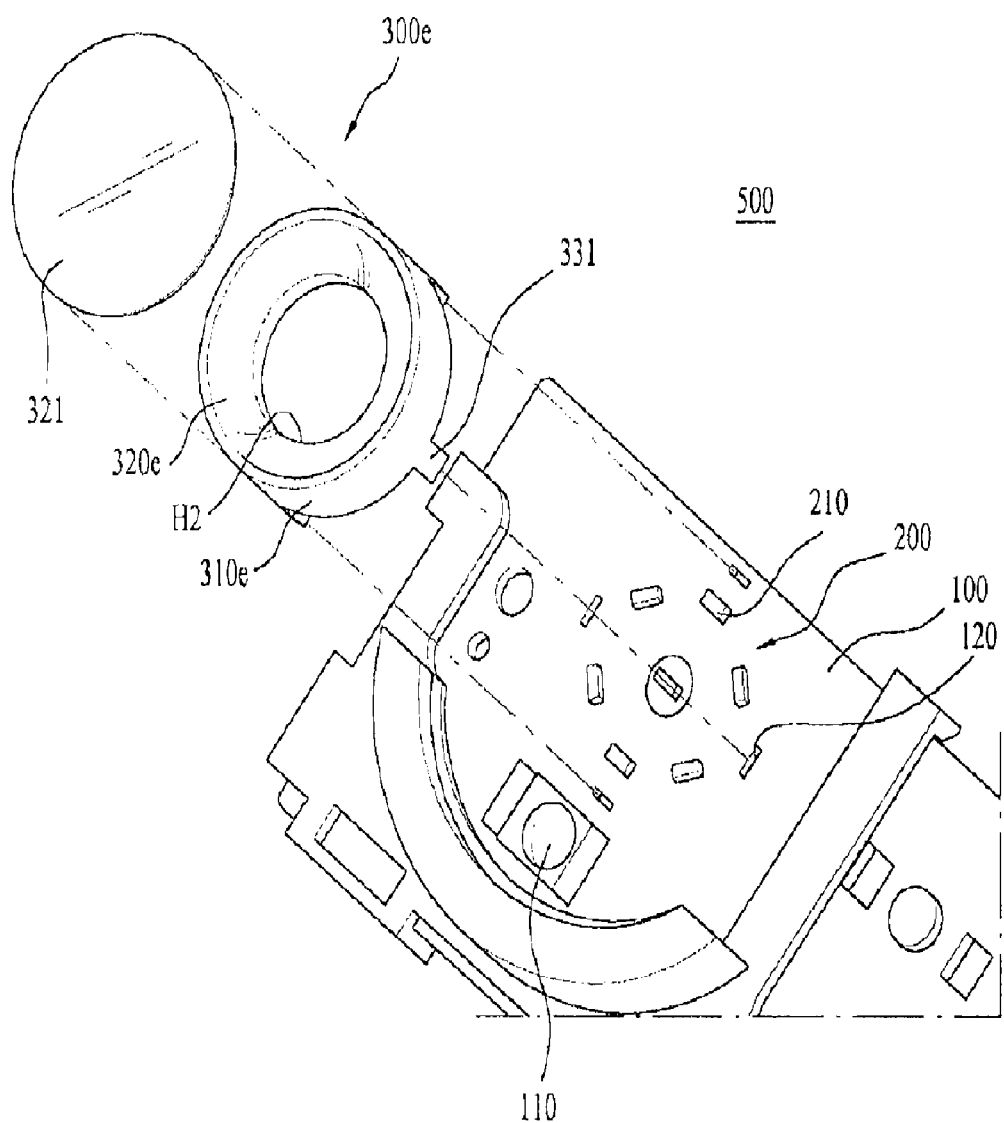

[Fig. 11]
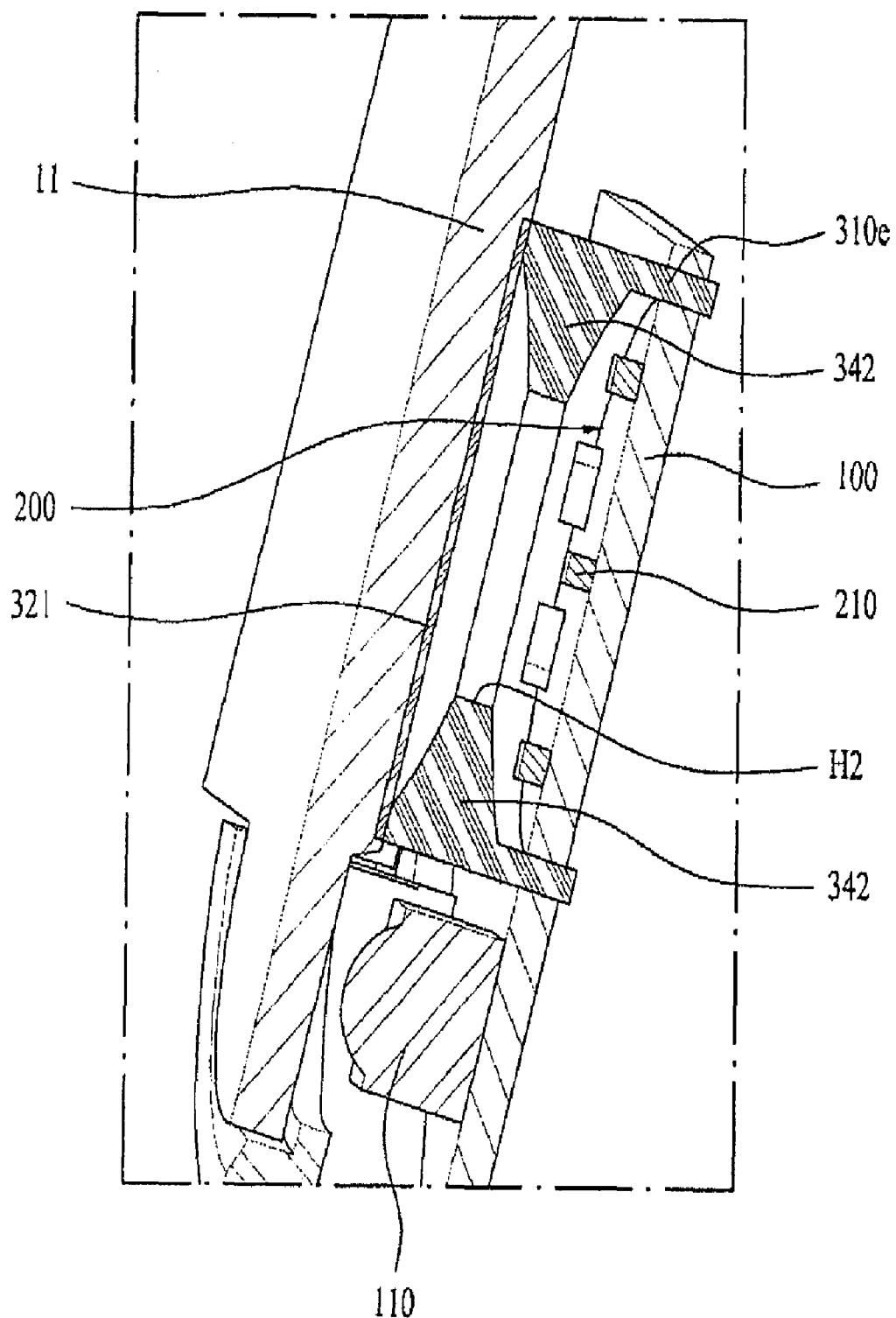

[Fig. 12]
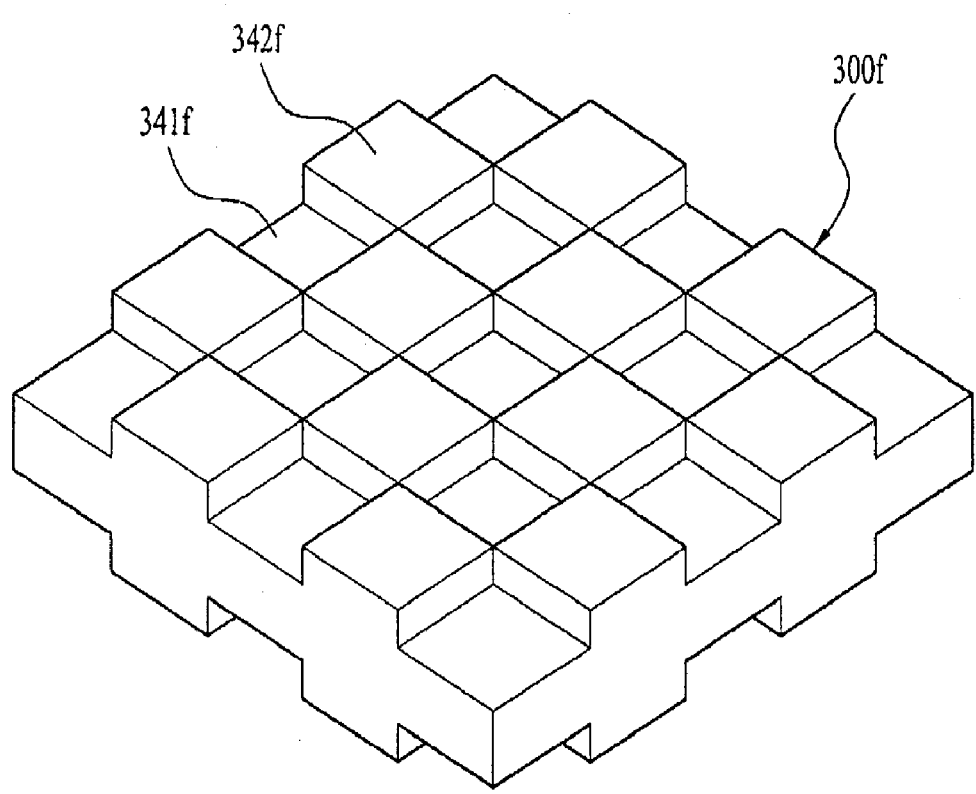

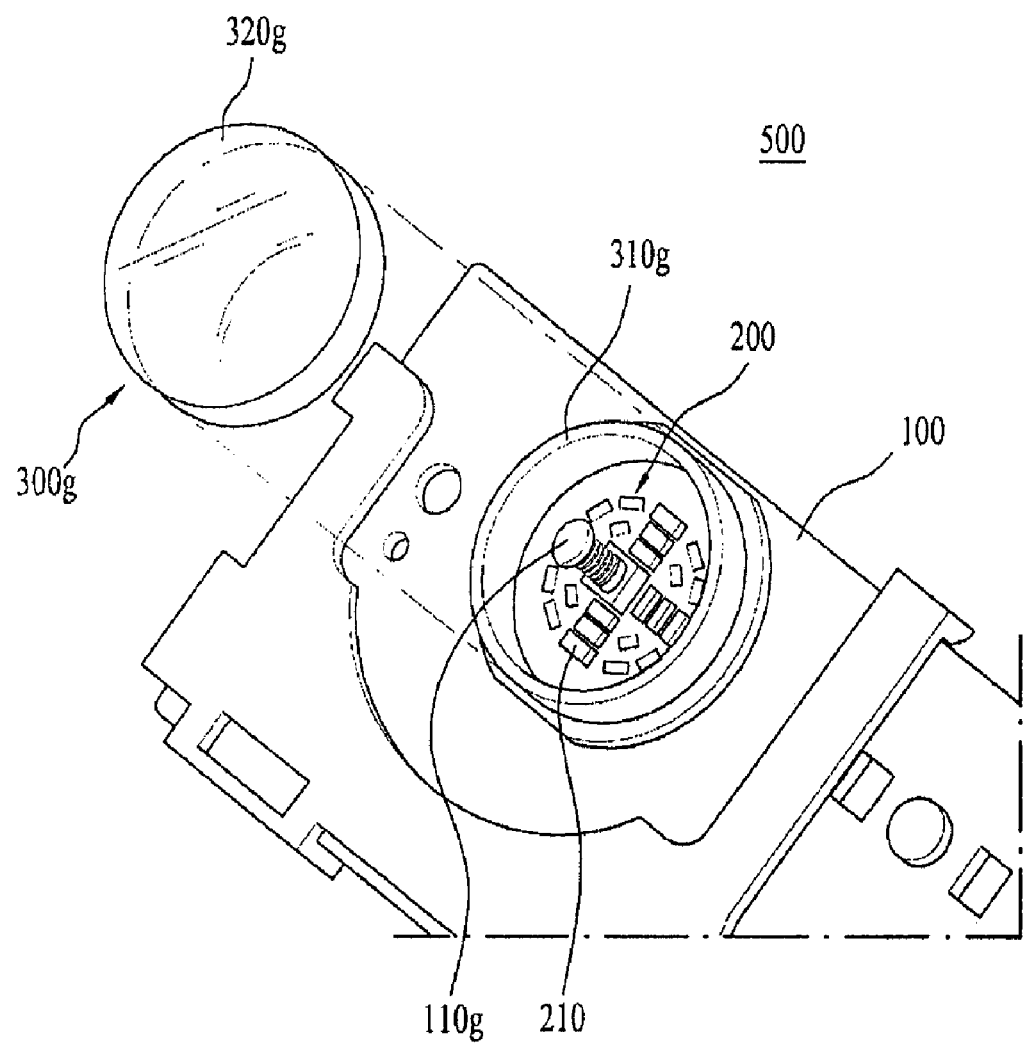
[Fig. 13]

[Fig. 14]
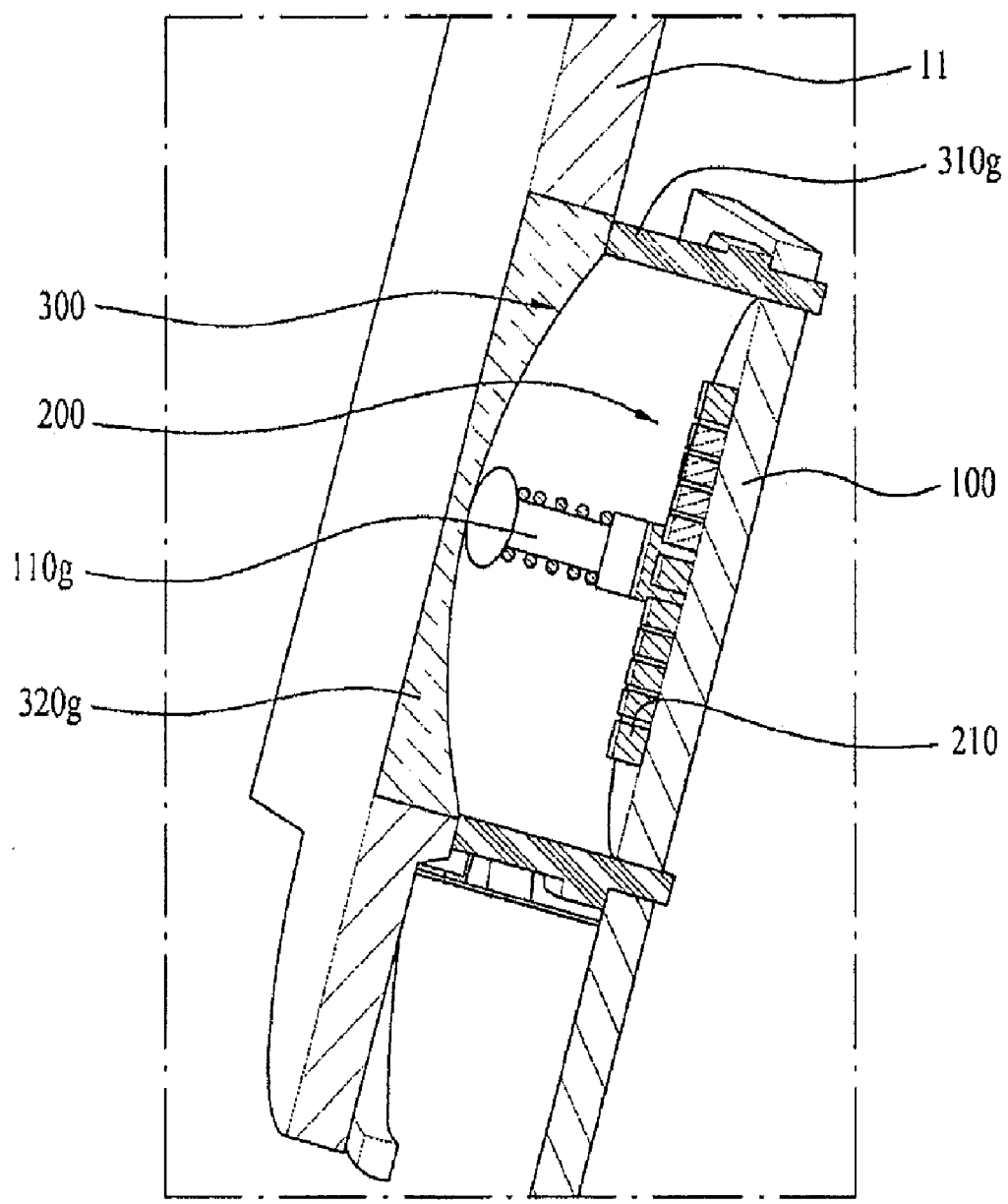

[Fig. 15]
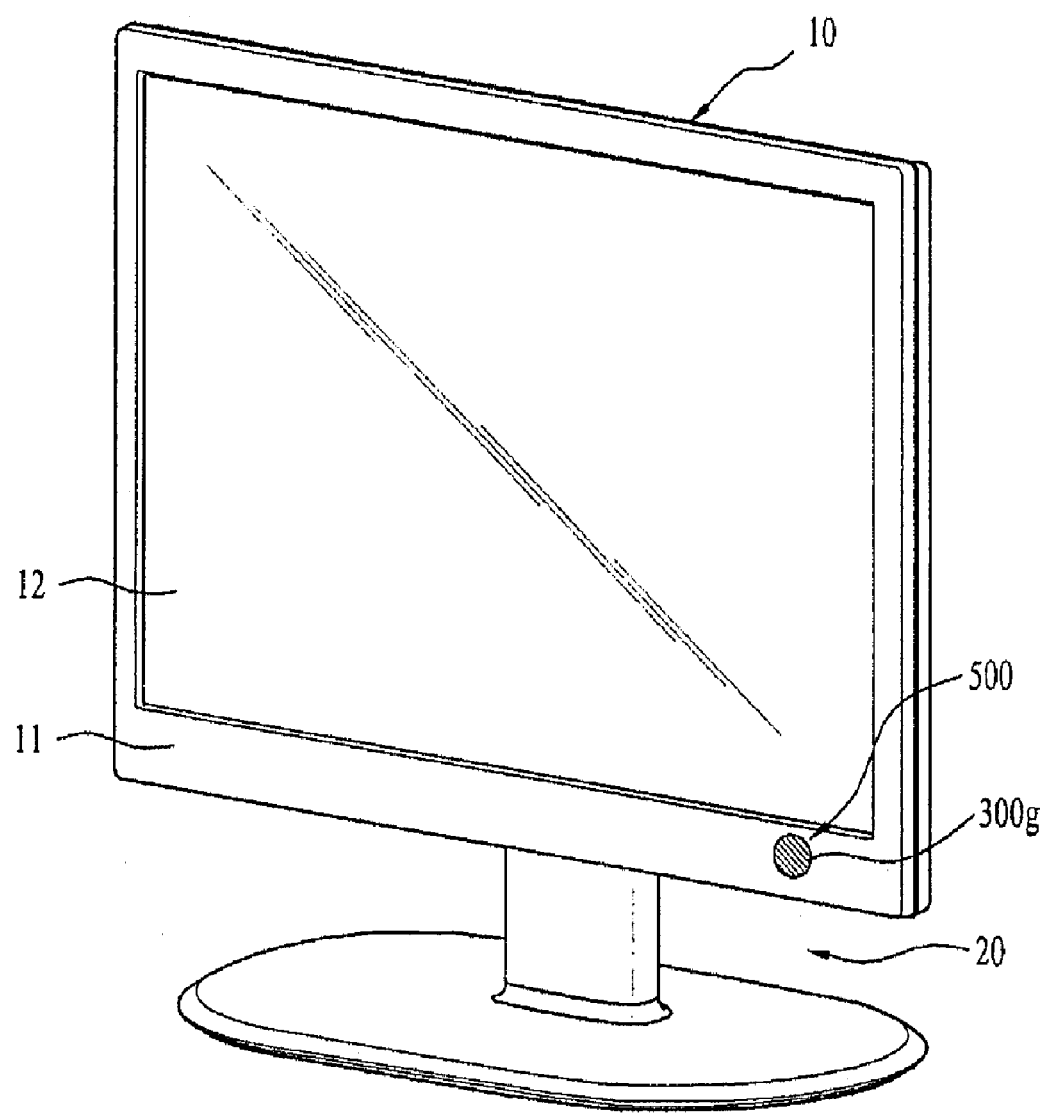

LIGHTING DEVICE AND DISPLAY DEVICE INCLUDING THE SAME

TECHNICAL FIELD

The present invention relates to a display apparatus. More specifically, the present invention relates to a lighting device and a display apparatus including the same to enhance a visual effect by emitting light.

BACKGROUND ART

Various home electric appliances including a TV, audio and monitor typically has a key button used to input predetermined information and the key button is light-emitting to inform a user whether to be operated or not.

DISCLOSURE OF INVENTION

Technical Problem

However, according to a conventional lighting device, there is a little delay time for the user to operate the lighting unit. If then, the user feels bored with the even little time because of its too simple lighting, which causes a problem of visual dissatisfaction. Substantially many kinds of parts as well as high production cost may be required to provide the user with a luxurious lighting.

To solve the problems, an object of the present invention is to provide a lighting device having a simple structure and visually beautiful exterior appearance and a display apparatus including the same, such that a visual satisfaction for the display apparatus including the lighting device may be maximized and that a user's boring feeling may be reduced.

To achieve these objects and other advantages and in accordance with the purpose of the invention, as embodied and broadly described herein, a lighting device includes at least one light source installed on a substrate, spaced apart a predetermined distance with each other; and a filter member provided over the light source with a variable thickness, the filter member where light emitted from the light source transmits The at least one light source may be turned on and off simultaneously.

The filter member may include an opening portion where the light of the light source transmits.

The opening portion may be formed at a center of the filter member.

The at least one light source may be installed radially with respect to a predetermined position of the substrate and the thickness of the filter member may be increasing or decreasing radially with respect to the predetermined position.

The light source may be mounted on the substrate, forming ranks and columns in parallel, and the filter member may be getting relatively thick and thin at an upper portion of the light neighboring sources repeatedly.

An outer surface of the filter member may be formed flatwise.

The filter member may be compounds of ABS resin and pigment.

A predetermined portion or overall portion of a surface of the filter member may be corroded.

The brightness of the light source may be gradually increased or decreased if each light source is turned on and off, respectively.

The lighting device may further include a guide part having a pipe shape provided on the substrate to surround the at least one light source and the filter member may be mounted on the guide part.

The filter member may be formed integrally with the guide part.

The lighting device may further include a control signal input part provided on the substrate.

The control signal input part may be a tact switch selectively pressed by the filter member to generate a control signal.

The control signal input part may be a remote control receiving part receiving a remote control transmitting signal.

In another aspect, a display apparatus includes a panel displaying an image; a front cover supporting a front edge portion of the panel; and a lighting device mounted in an opening portion formed at the front cover, the lighting device being exposed outside. The lighting device may include at least one light source installed on a substrate, spaced apart a predetermined distance with each other; and a filter member provided over the light source with a variable thickness, the filter member where light emitted from the light source transmits.

The brightness of light source may be gradually increased or decreased if each light source is turned on and off, respectively.

The at least one light source may be installed radially with respect to a predetermined position of the substrate and the thickness of the filter member may be increasing or decreasing radially with respect to the predetermined position.

The display apparatus may further include a guide part having a pipe shape provided on the substrate to surround the at least one light source and the filter member may be mounted on the guide part.

The filter member may be formed integrally with the guide part.

The display apparatus may further include a power switch provided on the substrate to be pressed by the filter member selectively.

The light source provided under a relatively thin portion of the filter member may be turned on first and turned off later, compared with the light source provided under a relatively thick portion of the filter member.

Advantageous Effects

The present invention has following advantageous effects.

First, the structure of the lighting device may be simple, with an improved visual beauty.

Furthermore, information of a display operational sate may be expressed variously, because the lighting device provides the user with various lighting effects.

A still further, the user may feel less bored during the delay time of the display apparatus.

BRIEF DESCRIPTION OF DRAWINGS

The accompanying drawings, which are included to provide further understanding of the disclosure and are incorporated in and constitute a part of this application, illustrate embodiments of the disclosure and together with the description serve to explain the principle of the disclosure.

In the drawings:

FIG. 1 is a perspective view illustrating a display apparatus according to an exemplary embodiment;

FIG. 2 is a diagram schematically illustrating a lighting device according to an exemplary embodiment;

FIG. 3 is a diagram illustrating a side plane section of the lighting device shown in FIG. 2;

FIG. 4 is a diagram illustrating a lighting device according to another embodiment;

FIG. 5 is a diagram illustrating a side place of the lighting device shown in FIG. 4;

FIG. 6 is a diagram illustrating a lighting device according to a still further embodiment;

FIG. 7 is a diagram illustrating a side plane section of the lighting device shown in FIG. 6;

FIG. 8 is a diagram illustrating a lighting device according to a still further embodiment;

FIG. 9 is a diagram illustrating a side plane section of the lighting device shown in FIG. 8;

FIG. 10 is a diagram illustrating a lighting device according to a still further embodiment;

FIG. 11 is a diagram illustrating a side plane section of the lighting device shown in FIG. 10;

FIG. 12 is a perspective view illustrating a filter member according to the embodiment of FIG. 11;

FIG. 13 is a diagram illustrating a lighting device according to a still further embodiment;

FIG. 14 is a diagram illustrating a side plane section of the lighting device shown in FIG. 13; and FIG. 15 is a perspective view illustrating a display apparatus according to an exemplary embodiment.

BEST MODE FOR CARRYING OUT THE INVENTION

Reference will now be made in detail to the specific embodiments of the present invention, examples of which are illustrated in the accompanying drawings. Wherever possible, the same reference numbers will be used throughout the drawings to refer to the same or like parts.

A lighting device according to the present invention may be applicable to various electric home appliances including an audio, computer, refrigerator and laundry apparatus as well as a display apparatus including a TV and monitor. FIG. 1 shows that a lighting device according to the present invention is applied to a display apparatus.

As shown in FIG. 1, a display apparatus according to an exemplary embodiment includes a body 10 and a stand 20 supporting the body.

The display body 10 includes a housing 11 and a panel 12. The housing 11 includes a front housing 11a and a rear housing 11b. The panel 12 receives an external input video signal and outputs an image converted from the input video signal. In addition, a button part is provided at a predetermined portion of the housing 11 for a user to operate the display apparatus and to input information on various functions.

In addition to the button part, in the housing may be provided a wireless signal receiving part (not shown).

Considering aesthetical finishing, display apparatuses recently released tend to have the button part provided at a front housing supporting the panel 12 and to have button parts, corresponding to various control signals, provided at a side portion of the housing.

As a result, only a power button and the like may be provided at a front portion of the housing or the front housing and a wireless signal receiving module may be provided within the front housing.

Here, if the power button is provided at the front housing 11a, a lighting device 500 may be further provided at the front housing 11a for the user to notice the position of the power button conveniently. In addition to guiding the location of the button, the lighting device may be employed to improve design beauty and user satisfaction.

An operational state of the display apparatus including the lighting device may be displayed in relation to an identifiable state of the lighting device.

As shown in FIG. 2, the lighting device according to an exemplary embodiment includes at least one light source 210 mounted on a substrate 100, spaced apart a pre-determined distance from each other, and a filter member 300 provided over the light sources 210, with a variable thickness, for light supplied by the light source 210 only to transmit.

The number of the light sources 210 of the lighting device may be determined in proportion to the size of the substrate 100. That is, if the size of the substrate is relatively small, a relatively small number of the light sources 210 may be mounted on the substrate 100. If the size of the substrate 100 is relatively large, a relatively large number of the light sources 210 may be mounted on the substrate 100.

The light source 210 may be a light-emitting diode (LED).

As mentioned above, the filter member 300 may be provided over the light source 210. The light supplied by the light source 210 transmits the filter member 300 and the thickness of the filter member 300 may be changing. The reason why the thickness is variable is that various visual effects may be induced according to the transmissivity of light emitted from the light source 210.

The filter member 300 is configured of material which is light-transmissible. During the transmission of the light emitted from the light source 210 via the filter member 300, the light is turned off relatively slow at a thick portion of the filter member 300 only to create a visual effect of turning on the light slow and the light is turned off relatively fast at a less thick portion of the filter member 300 only to create a visual effect of turning off the light fast.

Such the visual effect may be generated because the brightness of the light emitted during the turning on/off the light source 210 is increasing and decreasing gradually from an off-state to an on-state. That is, the light emitted from the light source 210 based on the on/off of the light source is not turned on/off immediately but there is a period where the brightness of the light source is increasing/decreasing gradually. In addition, it may be determined according to the thickness of the filter member 300 whether the light emitted from the light source 210 can transmit the filter member 300.

If the lighting device is seen outside, the light emitted from the lighting device may be turned on and off gradually according to the thickness of the filter member 300 during the repeated turning on/off of the light sources 210.

Such the effect of gradually turning on/off the light may be achieved if the plurality of the light sources 210 are turned on/off simultaneously. The brightness of light may be controlled to increase or decrease when each of the light sources 210 is turned on or off.

As mentioned above, the effect of the gradual light turning on/off may be given to an observer by the changing thickness of the filter member 300 even with the turning on/off the plural light sources simultaneously. However, if the period of increasing the brightness of the light source gradually and the period of decreasing the intensity of light gradually are increased artificially, the effect of the gradual light turning on/off may be improved by the interaction with the filter member 300 having the changing thickness.

Here, if the plural light sources are turned on/off gradually, the same effect may be achieved. According to the embodiment shown in FIG. 2, the light sources 210 may be arranged in a radial shape.

The light sources 210 are arranged radially with respect to a predetermined position of the substrate and the thickness of the filter member may be increasing or decreasing radially with respect to the position.

According to the embodiment shown in FIGS. 2 and 3, the filter member 300 is getting thicker toward the predetermined position, that is, a center of the filter member 300. If the light sources are turned on simultaneously, the center of the filter member seems to be turned off last.

As a result, the same effect may be achievable if the order of turning on/off the light sources located at an outer portion of the substrate 100 and a center portion of the substrate 100 is determined even without the thickness of the filter member 300 changed gradually. If then, it is necessary that an auxiliary control for turning on/off the light sources 210 should be provided.

However, as shown in FIG. 2, a kind of a similar effect may be achieved by the method of changing the thickness of the filter member 300 where the light of the light source 210 transmits. Of course, various effects may be achievable if both the filter member 300 having the changing thickness and the control of the gradual light source turning on/off are adapted together with that.

Further, the filter member 300 may include pigment to diffuse the light emitted from the light source 210 such that the observed light may look gleam. The filter member 300 may be made of ABS resin which is transparent for light to transmit. If the pigment is added, the color of the filter member 300 is changed into kind of milk-white, which is semi-transmissible.

The light transmitting the filter member 300 having the pigment is refracted into a pigment particle to be scattered and diffused. The light having transmitted the filter member 300 may be diffused gently because the light having transmitted the filter member 300 is scattered.

The amount of the added pigment may be determined according to the thickness of the filter member 300. That is, if the filter member 300 is relatively thin, a relatively much amount of pigment may be added and if it is relatively thick, a relatively less amount of pigment may be added.

According to the method of adding the pigment to ABS resin, the light may be scattered and diffused via the filter member 300.

In addition to the method of adding the pigment to the filter member 300, a method may be used in that a predetermined portion or all portions of a surface of the filter member may be corroded or polished.

That is, the adding of the pigment to the filter member 300 is a method for scattering or diffusing the light via the filter member and the corroding or polishing the surface of the filter member is a method for scattering or diffusing the light emitted from the filter member 300 at the surface of the filter member 300.

Further, a guide 310 may be provided to install the filter member 300 over the light sources 210 arranged on the substrate 100, spaced apart a predetermined distance from the light sources 210. The guide 310 is pipe-shaped and it is mounted on the substrate 100, supporting a rim of the filter member 300.

The guide 310 reflects and guides the light emitted from the light source 210 toward the filter member 300.

Here, according to the lighting device 500 including a light emitting member 200 configured of the plurality of the light sources 210, the effect that the lighting device 500 is gradually brightened and darkened when turned on and off, respectively, may be referenced to as "gradual light turning on/off effect" or "breathing effect."

The gradual light turning on/off effect or the breathing effect may be generated by directly turning on/off the plurality of the light sources 210 in order. As mentioned above, if the thickness of the filter member 300 is changing, the above gradual light turning on/off effect or the breathing effect may be generated even without directly turning on/off the light sources in order.

As shown in FIGS. 2 and 3, the light sources 210 are arranged on the substrate 100 in a radial shape and then the filter member 300 having the changing thickness is mounted over the light sources 210 to cover the light sources 210. If then, even when the plural light sources 210 are turned off at the same time, the light sources 210 may have the gradual turning off effect or the breathing effect by the different thickness of the filter member 300 covering the corresponding light sources 210.

Thus, various visual effects may be generated if the light sources 210 themselves are turned on/off gradually together with the usage of the filter member 300 having the changeable thickness.

The turning on/off each of the light sources 210 may be performed by a control part (not shown). An auxiliary one only for the control of each light source 210 may be provided or a micom controlling an overall process of a home appliance where the lighting device may be installed.

The control signal input part 110 shown in FIG. 3 is provided for the user to input an on/off signal or various functions if the lighting device according to the present invention is applied to a specific electric home appliance.

The control signal input part 110 may be a remote control receiving part. The housing 11 exposed outside, covering the filter member 300, may be fabricated of light-transmissible plastic. As a result, if provided on the substrate 100, the control signal input part 110 configured of the remote control receiving part may receive a wireless signal transmitted outside as a control signal of the electric home appliance where the lighting device is installed.

If the control signal input part 110 composing the lighting device is installed on the substrate 110, parts of the appliance where the lighting device is installed may be simplified. The lighting device according to the present invention is embedded in the front housing supporting an edge portion of the panel which displays images, in case that it is installed in a display apparatus. As a result, to install the remote control receiving part at the front housing, an auxiliary substrate should be provided. If the control signal input part 110 configured of the remote control receiving part is installed on the substrate 100 composing the lighting device, the substrate is shared and the parts can be simplified.

Furthermore, an auxiliary switch button 112 may be provided in addition to the control signal input part 110. The button 112 may be a tact switch or a contact switch. In the former case, the button 112 is pressed to generate a control signal and in the latter case, the button 112 is touched by some parts of the user's body to generate a control signal. Here, any switches usable to input a control signal may be applicable.

If the control signal input part 110 is configured of the remote control receiving part and the button 112 is configured of the control button such as a power button, other various parts may be provided on the substrate of the lighting device, which can reduce assembly cost of parts.

Next, in reference to FIGS. 4 to 11, various embodiments of the filter member will be described.

According to embodiments of FIGS. 4 and 5, the components except the parts relating to the filter member and light emitting member are substantially identical to those of the embodiments shown in FIGS. 4 and 5, and detailed description of the identical components will be omitted accordingly.

As shown in FIG. 4, the light emitting member 200 includes the light sources 210 arranged in its center or its outer portion. Here, the light sources arranged in the outer portion may be spaced apart a predetermined distance from the center. As mentioned above, the gradual light turning on/off effect or the breathing effect can be achieved by gradually turning on/off the light sources 210 directly. To embody the effect gently, quite a number of light sources 210 should be substantially provided. However, if the filter member 300 having the changing thickness is provided, the number of the light sources 210 can be reduced and the same effect can be achieved even with the light sources 210 turned on/off simultaneously.

According to the embodiment of FIGS. 4 and 5, the filter member 300b includes an opening portion (H) formed at its center. Since the opening portion (H) is corresponding to a case in that the thickness of the filter member 300b is zero, the filter member 300b according to the embodiment of FIGS. 4 and 5 may be also have the changing thickness.

In addition, according to the embodiment of FIGS. 4 and 5, an auxiliary diffusion member 321 may be further provided at the filter member 300b. As mentioned above, the transmitted light may be gentle by the adding of the pigment or the polishing of the surface. According to the embodiment of FIGS. 4 and 5, some portion of the filter member 300b is open and the light sources 210 are exposed outside directly.

As a result, the diffusion member 321 may be provided for the light emitted from the light sources exposed outside to be diffused gently in the overall portion of the lighting device.

In reference to FIG. 5, the light emitted from the light sources 210 is guided by the guide 310. If then, the light of the center passes the opening portion (H) and the light is diffused and emitted at the diffusion member 321. The light of the outer portion transmits the filter member 300b and the diffusion member 321 sequentially.

The light having passed the opening portion (H) may transmit the opening portion (H) without passing the filter member 300b. As a result, even if the light sources 210 of the light emitting member 200 are turned on/off simultaneously, it seems to the user that the light sources exposed via the opening portion (H) are turned on earlier than the other ones.

As mentioned above, the brightness of each turned on and off light source is increasing and decreasing gradually even for a substantially short time period. During the time period in which the brightness of the light passing the filter member 300b, the effect may be generated by the scattering of the filter member 300b in that the light sources 210 located under the filter member 300b are turned off earlier than the other ones.

If the light sources 210 located under the opening portion (H) are formed at the center of the filter member 300b, it seems that the opening portion (H) is turned on earlier.

The opening portion (H) is the area corresponding to the zero thickness of the filter member 300b only to maximize the gradual light turning on/off effect or the breathing effect. In this case, it is preferable that the diffusion member 321 is further provided.

As shown in FIG. 5, the diffusion member 321 may be a sheet which is relatively thinner than the filter member.

The light emitted from the light sources 210 of the light emitting member 200 is scattered or diffused at the center of the filter member 300b by the diffusion member 321 before passing the diffusion member 321 and the light emitted from the light sources 210 having transmitted the filter member 300b is diffused at the outer portion by the diffusion member 321. As a result, even during the short time period, the speed of emitting the light after transmitting the diffusion member 321 is substantially slower at the outer portion of the filter member 300b than at the center of the filter member 300b.

As mentioned above, if the brightness of the light source is increasing and decreasing when turning on/off each of the light sources, the light with the intensity under a pre-determined value cannot transmit the filter member 300b. Thus, during the time period in which the brightness of each light source is increasing, the light sources seem to be turned on later at the thick portion of the filter member 300b. During the time period in which the brightness of the light source is decreasing, the light sources seem to be turned on later at the thick portion of the filter member 300b.

Thus, even if the light sources 210 composing the light emitting member 200 are turned on simultaneously, it seems that the light emitting is performed at the center of the diffusion member 321 first and that the light is diffused gradually along to the outer portion.

Next, in reference to FIGS. 6 and 7, another embodiment of a lighting device will be described.

According to the embodiment of FIGS. 6 and 7, the other components except the ones relating to the filter member and light emitting member are substantially identical to those of the embodiments shown in FIGS. 2 and 3 and the identical description of this embodiment will be omitted.

As shown in FIG. 6, the plurality of the light sources 210 may be provided at the center and the outer portions of the light emitting member 200. The light sources arranged in the outer portion may be spaced apart a predetermined distance from the center of the light emitting member 200. That is, it is possible to reduce the number of the light sources 210, because the light sources 210 are not continuously arranged.

If the plurality of the light sources 210 are provided, it takes a relatively much time and costs relatively a lot to install the plural light sources 210. As a result, the light is scattered and diffused by both the filter member 300c and the auxiliary diffusion member that could be added and then the number of the light sources may be reduced.

In addition, the filter member 300c includes a filter part 320c where the light transmits and a guide part 310c guiding the light of the light source 210 to the filter part 320c, being formed integrally with the filter part 320c.

As a result, according to the embodiment of FIG. 6, the light sources 210 are arranged on a center and an outer portion of the substrate 100 which are covered by the filter part 320c. The pattern or appearance of the light sources arrangement may be variable.

The embodiment of FIG. 6 shows that the light sources 210 are mounted on the center, upper and lower portions and both opposite side portions of the substrate 100. However, the light sources 210 may be arranged in a diagonal line direction.

As shown in FIGS. 6 and 7, the filter part 320c may be formed integrally with the guide part 310c preventing the light emitted by the light emitting member 200 from leaking sideward. The guide part 310c reflects the light emitted by the light source toward the filter part 320c.

A securing protrusion 331 is formed at a lower end of the filter part 320c and a securing groove 120 is formed at the substrate 100 such that the securing protrusion 331 of the filter part 320c may be secured to the securing groove 120 of the substrate 100.

As shown in FIG. 7, the center of the filter part 320c has a different thickness from the thickness of the outer portion, in order to differentiate at the center and the outer portion of the filter part 320c the transmissity or scattering of the light emitted from the light sources 210.

The filter part 320c includes a first filtering portion 341 having a relatively less thickness and a second filtering portion 342 having a relatively more thickness. The first filtering portion 341 is provided at the center of the filter part 320c and the second filtering portion 342 is provided at the outer portion of the filter part 320c.

The filter part 320c is curved gently as mentioned above and thus the thickness of the filter part 320c is gradually getting thinner from the outer portion to the center.

As a result, the light emitted from the light emitting member 200 looks turned on first at the first filtering portion 341 and it also looks spreading toward the thicker second filtering portion 342.

Because of the thickness variation, the light is gradually emitting and diffusing from the center, that is, the first filtering portion 341 toward the outer portion, that is, the second filtering portion 342 even with the light sources 210 of the light emitting member 200 being turned on simultaneously. Then, if the light sources 210 of the light emitting member 200 are turned off, the light gradually disappears first from the outer portion toward the center portion.

With the repeated turn-off of the light emitting member 200, the light emitted via the filtering member seems to breathe, which is called the breathing effect.

As shown in FIG. 7, an outer surface of the filter part 320c may be formed flatwise. If an inner surface of the housing 11 is formed flatwise, the flatwise outer surface of the filter part 320c makes the overall assembly easier, reducing the gap which could be generated during the assembly works.

Next, in reference to FIGS. 8 and 9, a still further embodiment of a lighting device will described.

The embodiment of the FIGS. 8 and 9 is substantially identical to the embodiment of FIGS. 6 and 7, except the components relating to the filter part and the repeated description will be omitted accordingly.

As shown in FIGS. 8 and 9, a filter member 300d includes a guide part 310d guiding the light of the light source 210 and a filter part 320d where the light of the light source transmits.

A securing protrusion 331 is formed at a lower end of the filter part 300d and a securing grove 120 may be provided at the substrate 100 such that the securing protrusion 331 may be secured to the securing groove 120.

The filter part 320d is a portion of the filter member 300d where the light emitted from the light emitting member 200 transmits. According to this embodiment of FIGS. 8 and 9, front and rear surfaces of the filter part 320d are concave.

Different from the filter part of the above embodiment shown in FIGS. 6 and 7, the filter part 320d of this embodiment shown in FIGS. 8 and 9 has concave front and rear surfaces. Here, identical to the embodiment of FIGS. 6 and 7, the filter part and the guide part are formed as one body in this embodiment.

That is, the filter part 320d includes a first filter portion 341 and a second filtering portion 342. The first filtering portion 341 is relatively thinner than the second filtering portion 342. The first filtering portion 341 is provided at the center of the filter part 320d and the second filtering portion 342 is provided at the outer portion of the filter part 320d.

While only the rear surface of the filter part 320c facing the light sources 210 is concave according to the embodiment of FIGS. 6 and 7, both the front and rear surfaces of the filter part 320d may be concave similar to a concave lens.

With this difference, if the light emitting member 200 is turned on, the light is gradually emitting and diffusing from the center of the filter member 300d toward the outer portion. If the light emitting member 200 is turned off, the light gradually disappear from the outer portion toward the center of the filter member.

Compared with the difference of the thickness between the first and second filtering portions 341 and 342 according to the embodiment of FIGS. 6 and 7, the difference of the thickness between the first and second filtering portions 341 and 342 is substantially large, which can make the breathing effect relatively more smooth and gentle when turning off the light sources 210.

Next, in reference to FIGS. 10 and 11, a still further embodiment will be described.

This embodiment of FIGS. 10 and 11 is substantially identical to the embodiment of FIGS. 8 and 9, except components relating to the filter member, and the repeated description will be omitted accordingly.

As shown in FIGS. 10 and 11, a filter member 300e includes a guide part 310e guiding the light emitted from the light emitting member 200 and a filter part 320e where the light of the light emitting member 200 transmits.

A securing protrusion 331 is formed at a lower end of the filter member 300e and a securing groove 120 is formed at the substrate 100 secured to the securing protrusion 331.

An opening portion (H2) with a predetermined diameter is formed at the filter part 320e of the filter member 300. The light of the light emitting member 200 passes through the opening portion H2 directly and the light is scattered at a surrounding outer portion of the opening portion H2.

That is, the opening portion H2 means the portion of the filter part with "0" thickness. Different from the filter part of the embodiment of FIGS. 4 and 5, the filter part of this embodiment shown in FIGS. 10 and 11 is getting thicker from its center toward its circumference. Since the thickness of the filter part 320e is changing itself, the more gentle breathing effect can be substantially achieved.

As a result, the light of the center of the light emitting member 200 is directly diffused to the diffusion member 321 via the opening portion H2, only to be emitted outside. The light of the outer portion of the light emitting member 200 is scattered, transmitting the filter part 320e, and then it is diffused at the diffusion member 321 to be emitted outside.

Specifically, when the light emitting member 200 is turned on, the light is gradually emitting from the center toward the outer portion. When the light emitting member 200 is turned on, the light gradually disappear from the outer portion to the center.

FIG. 12 shows a still further embodiment of a filter member having the changing thickness, where the light transmits. According to this embodiment, the filter member 300f is rectangular shaped, not a circular shaped.

The light sources are mounted on the substrate, forming ranks and columns in parallel to the substrate. The filter member 300f is repeatedly thick and thin with respect to an upper portion of the light sources.

That is, according to this embodiment of FIG. 12, recessed portions 341f and projected portions 342f are repeatedly formed at the filter member 300f, not the thickness of the filter member 300f being changing.

If each of the light sources is installed corresponding to each of the recessed and projected portions, the light sources are turned on simultaneously and then the light looks to be turned on first at the recessed portions 341f and to be gradually turned on later at the projected portions. If the light sources are repeatedly turned on and off simultaneously, the filter member 300f looks glimmering.

Here, the recessed portions 341f may be the thin portions of the filter member or the opening portion as mentioned in the above embodiments. If the recessed portions are throughholes, the diffusion member may be further provided in this embodiment to diffuse the light having passed through the holes.

FIGS. 13 and 14 show a still further embodiment of a lighting device. According to this embodiment of FIGS. 13 and 14, an input part 110g may be further provided at the center of the light emitting member 200. The input part 110g may be a switch for generating a control signal selectively. The user presses a filter member 320g selectively to generate the control signal. The switch may be a power button, for example.

FIG. 14 illustrates a sectional view of the lighting device according to this embodiment. For the input part 110g to be a switch, the filter part should be exposed outside. Different from the above embodiments, a filter part 320f according to this embodiment may be exposed outside via the housing.

As shown in FIG. 14, the filter part 320g is exposed outside via the housing 11 where the lighting device is installed. The filter part 320g may be made of plastic which enables the light to transmit. The filter part 320g may be separate from or formed integrally with the guide guiding the light of the light sources 210.

If a tack switch, for example, is used as the input part, the securing protrusion formed at the guide 310g and the securing groove formed at the substrate 100 may have gaps large enough for the tact switch to be pressed.

The FIG. 15 illustrates the display apparatus having the lighting device according to the embodiment mounted thereto. According to the embodiment of FIG. 15, the filter member 300g of the lighting device is exposed outside via the front housing of the display apparatus. As a result, the turned on/off the light sources of the lighting device can be observable substantially clearly.

At this time, the method of adding pigment or the method of corroding its surface may be applied to the filter member 300g to create the more gentle lighting effect.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A lighting device, comprising:
   at least one light source installed on a substrate, spaced apart a predetermined distance from each other;
   a filter member provided over the at least one light source having a variable thickness, wherein light emitted from the at least one light source is transmitted through the filter member; and
   a guide having a pipe shape provided on the substrate, wherein the guide surrounds the at least one light source, and wherein the filter member is mounted on the guide.

2. The lighting device as claimed in claim 1, wherein the at least one light source comprises a plurality of light sources turned on or off simultaneously.

3. The lighting device as claimed in claim 1, wherein the filter member comprises an open portion through which the light of the light source is transmitted.

4. The lighting device as claimed in claim 3, wherein the open portion is formed at a center of the filter member.

5. The lighting device as claimed in claim 1, wherein the at least one light source comprises a plurality of light sources installed radially with respect to a predetermined position of the substrate, and wherein the thickness of the filter member increases or decreases radially with respect to the predetermined position.

6. The lighting device as claimed in claim 1, wherein the at least one light source comprises a plurality of light sources mounted on the substrate, forming ranks and columns in parallel, and wherein a plurality of recessed portions and a plurality of projected portions are alternatively formed in the filter member corresponding to the plurality of light sources, respectively.

7. The lighting device as claimed in claim 5, wherein an outer surface of the filter member is formed flat.

8. The lighting device as claimed in claim 1, wherein the filter member is made of compounds of ABS resin and pigment.

9. The lighting device as claimed in claim 1, wherein a predetermined portion or overall portion of a surface of the filter member is polished.

10. The lighting device as claimed in claim 2, wherein a brightness of the plurality of light sources gradually increases or decreases when each of the plurality of light sources is turned on or off, respectively.

11. The lighting device as claimed in claim 1, wherein the filter member is formed integrally with the guide.

12. The lighting device as claimed in claim 1, further comprising a control signal input provided on the substrate.

13. The lighting device as claimed in claim 12, wherein the control signal input comprises a button that is selectively pressed by the filter member to generate a control signal.

14. The lighting device as claimed in claim 12, wherein the control signal input comprises a remote control receiver that receives a remote control transmitting signal.

15. A display apparatus, comprising:
   a panel that displays an image;
   a front cover that supports a front edge portion of the panel;
   a lighting device mounted in an open portion formed at the front cover, the lighting device being exposed outside, wherein the lighting device comprises:
      at least one light source installed on a substrate, spaced apart a predetermined distance from each other; and
      a filter member provided over the at least one light source having a variable thickness, wherein light emitted from the at least one light source is transmitted through the filter member.

16. The display apparatus as claimed in claim 15, wherein the at least one light source comprises a plurality of light sources, and wherein a brightness of the plurality of light sources gradually increases or decreases when each of the plurality of light sources is turned on or off, respectively.

17. The display apparatus as claimed in claim 15, wherein the at least one light source comprises a plurality of light sources installed radially with respect to a predetermined position of the substrate, and wherein the thickness of the filter member increases or decreases radially with respect to the predetermined position.

18. The display apparatus as claimed in claim 15, further comprising a guide having a pipe shape provided on the substrate, wherein the guide surrounds the at least one light source, and wherein the filter member is mounted on the guide.

19. The display apparatus as claimed in claim 15, wherein the filter member is formed integrally with the guide.

20. The display apparatus as claimed in claim 16, further comprising a power switch provided on the substrate configured to be selectively pressed by the filter member.

21. The display apparatus as claimed in claim 15, wherein the at least one light comprises a plurality of light sources, and wherein a light source of the plurality of light sources provided under a relatively thinner portion of the filter member is turned on first and turned off later, compared to the other light sources of the plurality of light sources provided under a relatively thicker portion of the filter member.

* * * * *